Figure 6:
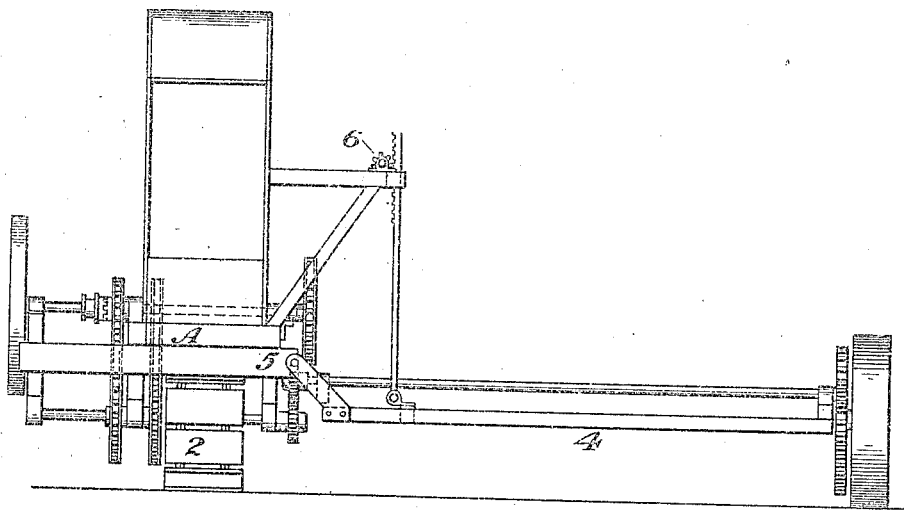

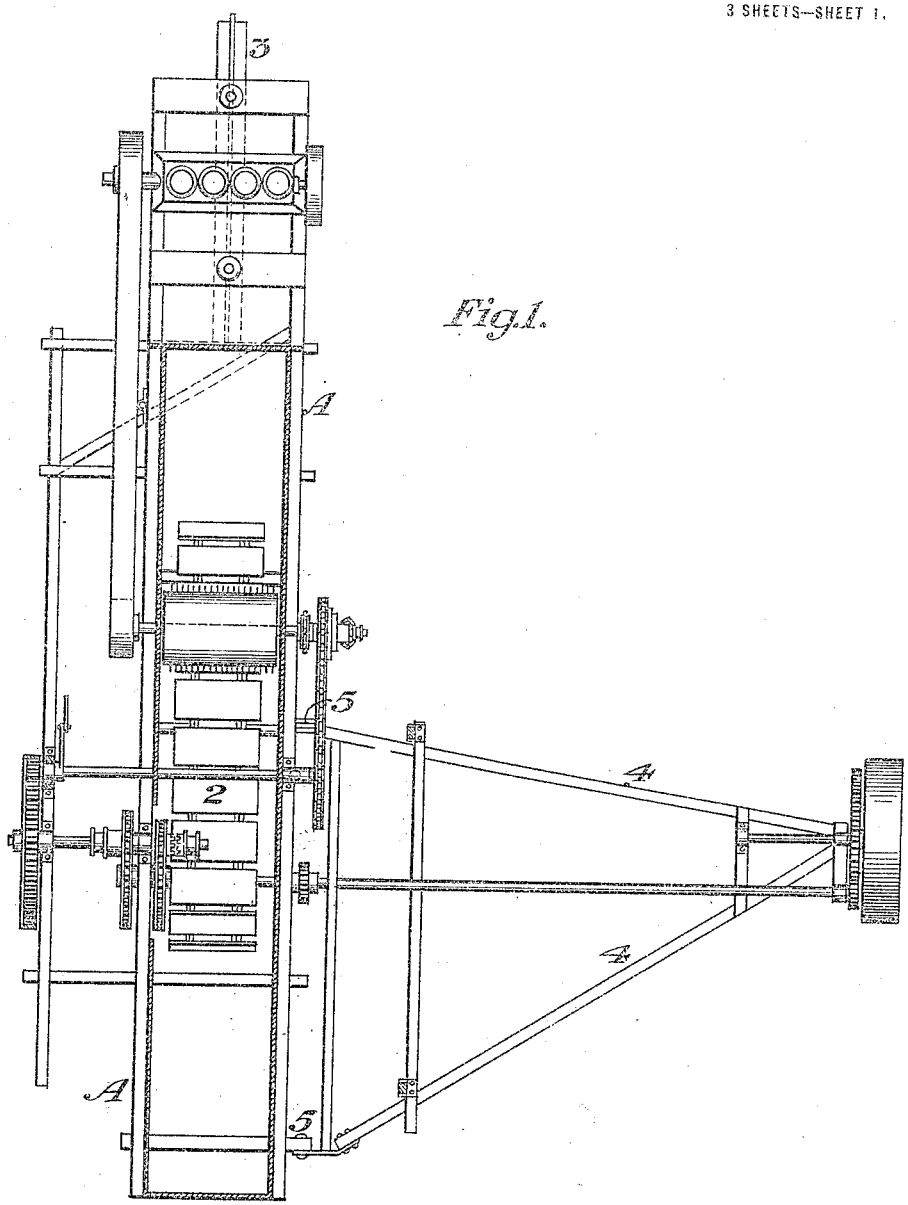

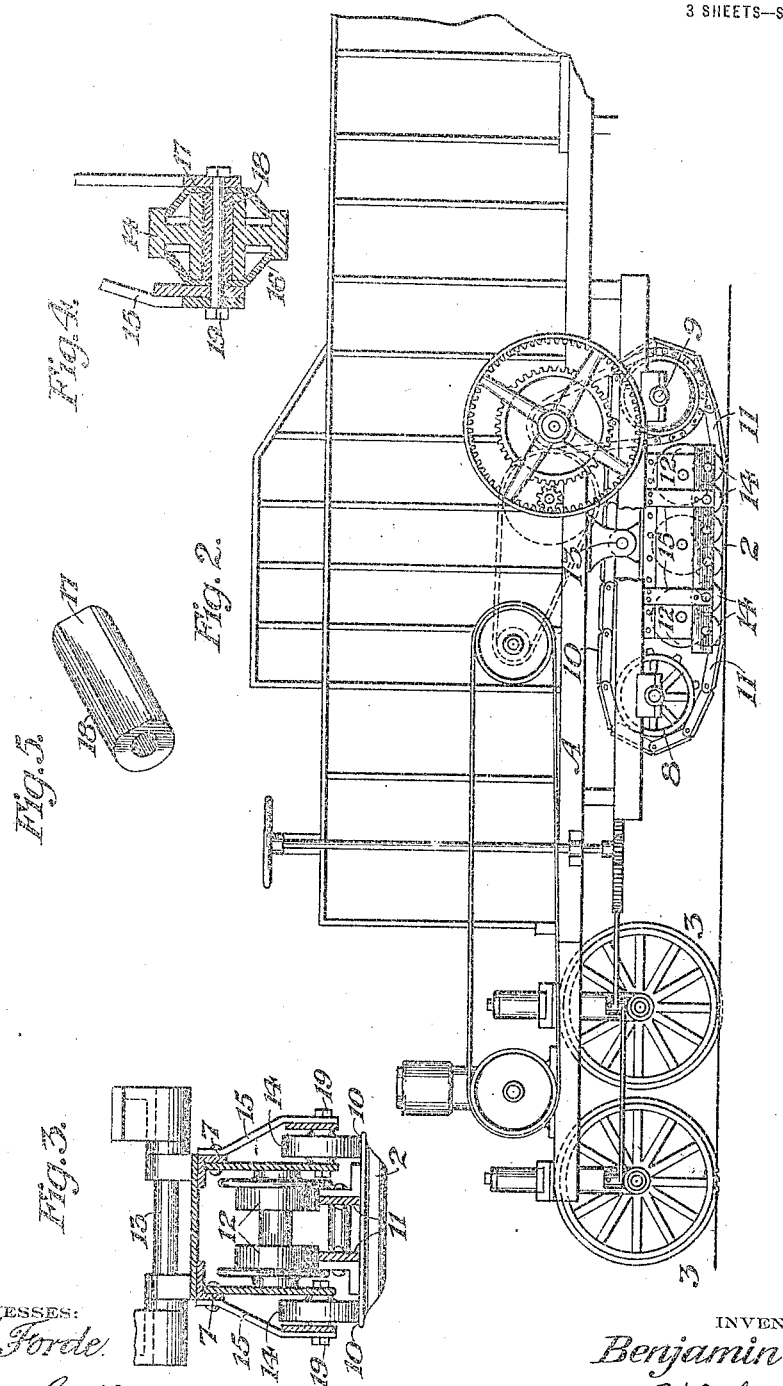

B. HOLT.
TRAVELING HARVESTER.
APPLICATION FILED JAN. 27, 1913.

1,194,739.

Patented Aug. 15, 1916.
3 SHEETS—SHEET 3.

WITNESSES:
L. J. Forde.
Thos Eastberg

INVENTOR
Benjamin Holt.
BY G. H. Strong,
ATTORNEY

UNITED STATES PATENT OFFICE.

BENJAMIN HOLT, OF STOCKTON, CALIFORNIA, ASSIGNOR TO THE HOLT MANUFACTURING COMPANY, OF STOCKTON, CALIFORNIA, A CORPORATION OF CALIFORNIA.

TRAVELING HARVESTER.

1,194,739.  Specification of Letters Patent.  Patented Aug. 15, 1916.

Application filed January 27, 1913. Serial No. 744,532.

*To all whom it may concern:*

Be it known that I, BENJAMIN HOLT, a citizen of the United States, residing at Stockton, in the county of San Joaquin and State of California, have invented new and useful Improvements in Traveling Harvesters, of which the following is a specification.

This invention relates to traveling harvesters and particularly to those using an endless, flexible, self-laying track or traction member, such as shown, for instance, in my Patent No. 954,394, dated April 5, 1910. The extensive use of these machines under varying conditions of soil and topography has shown the frequent need of some means which will not only allow the traction member and the truck underneath which it runs to rock and yield, without materially affecting the body of the machine, but the need of means to maintain the truck rollers always on their tracks. In my prior patent mentioned the truck frame is a rigid part of the harvester frame, and the rollers on the truck frame run on parallel tracks formed on the back or inner side of the endless, flexible traction member.

The invention has for its objects first, the making of this truck yielding without the use of springs; and second, to insure the truck rollers always remaining on their tracks.

Having reference to the accompanying drawings—Figure 1 is a plan view of a traveling harvester to which the invention is applied, the cutting mechanism and other parts, not necessary for the present case, being omitted. Fig. 2 is a side elevation of the same with parts broken away to show my novel pivoted truck arrangement. Fig. 3 is a cross section through a portion of the frame and truck. Fig. 4 is a detail in cross section of a stabilizing roller. Fig. 5 is a perspective of a bushing for the stabilizing rollers. Fig. 6 is an end view of the apparatus.

A represents the main frame of the vehicle, chiefly supported upon a single self-laying track or traction member 2, and having front steering wheels 3. 4 is the usual header frame hinged to the side of the harvester frame 5, and 6 is a suitable rack and pinion or equivalent stabilizing device commonly used in side hill work.

The present invention relates particularly to the traction member 2 and the truck 7 which runs on the traction member and supports the main weight of the vehicle.

The flexible traction member 2 consists of a series of conjoined links adapted to travel around front and rear sprockets 8 and 9 suitably journaled in a line preferably centrally beneath the frame A; although manifestly such location is not essential to the invention. Each link of the traction member includes a tread plate 10, preferably of heavy sheet steel, usually about ten inches across measured in the direction of the length of the vehicle, and varies in length transversely of the machine from twelve to thirty inches, according to the character of the soil over which the machine is designed to operate.

On the back of each tread plate is secured centrally thereof a pair of parallel track links 11; the links of one track plate being pivoted to the links 11 of the succeeding track plate to form an articulated belt. These track links 11 form trackways in the nature of continuous rails for the rollers 12 of the truck 7 to run upon. The truck 7 is disposed between the sprockets 8—9 and is of such strength and rigidity as to provide in itself an inflexible, unyielding beam against which the back of the ground run of the traction member may bear. This truck is centrally and directly pivoted by a shaft 13 in the harvester frame, so that the truck has a limited rocking movement in a vertical plane about shaft 13 as a fulcrum; all springs being dispensed with.

It should be remarked that the underside of the rollers 12 on truck 7 projects a sufficient distance below the sprockets 8—9 so that these sprockets, or rather those portions of the track 2 which are in immediate engagement with the sprockets, never come in contact with the ground. In other words, the entire weight of the vehicle is carried on the rocking truck 7, quite independent of the sprockets 8—9.

Practice shows that this construction allows the flexible traction member to accommodate itself to rocks, stumps and other inconveniences encountered without the traction member buckling upward and without any material or objectionable vibration being imparted to the harvester frame. Such an arrangement is not only novel in practice, but it has been found to be of the greatest benefit and utility in the practical operation of these machines, as it gives the necessary cushioning action desired without shaking the machine too much and disturbing the level of the screens and conveyers entering into the make-up of the threshing mechanism. Experience has also shown that as ordinarily the track links are comparatively close together, there is more or less of a tendency of the traction member to tilt sidewise, especially on hilly ground or where traction plates of unusual transverse width were employed, with the result that not infrequently the rollers 12 would climb and leave their tracks 11. Whenever that would occur it would give rise to an awkward situation, particularly in view of the great weight of these heavy machines. To obviate this tendency of the rollers to climb and leave their track links 11, I have arranged on each side of the rollers 12 the supplemental side rollers 14, which are adapted to bear upon the inner sides and near the ends of the successive tread plates 10; these supplemental rollers 14 being journaled in brackets which are rigid with the truck frame 7. By this mode of construction the truck has four points or lines of bearing on the ground run of the traction member instead of two, with the result that no one of these points of bearing at any time is capable of acting as a fulcrum, independent of the other points of bearing, for a tread plate to rock on. In other words, when a machine is working on a side hill, if the weight is thrown on one half of a tread plate it is resisted from above by the rollers 12 and 14 on that side, with the consequence that the tread plate stays in contact with the rollers 12 and 14 on the other side. Practice shows as a result of this construction that the tread member remains at all times substantially normal to the truck, independent of whether the machine is traveling along level ground or on a side hill.

It is understood that the truck, with its rollers 12 and 14, and brackets 15 are all of the most substantial construction made necessary by the very heavy load carried.

16 are dust shields or guards for the stabilizing rollers 14, designed to exclude dust from the bearings, and also serve as a cap for an oil reservoir formed by the flattened portions 17 of the bushings or hollow spindles 18, on which the rollers 14 turn.

19 are pivot pins passing through the cap 16 and spindles.

Having thus described my invention, what I claim and desire to secure by Letters Patent is—

1. In a self-propelled vehicle, the combination of an endless, flexible traction member comprising a series of conjoined, articulated link sections forming continuous rails, each link section carrying a tread plate, a truck within the endless, flexible traction member having rollers running on the edges of said rails, and supplemental side rollers laterally outside of the truck rollers and bearing on the back of the ground run portions of said tread plates and near the side edges thereof to prevent sidewise rocking of the tread plates with relation to the truck.

2. In a traveling harvester, the combination with a main frame and a single pair of sprocket wheels arranged in the same plane one in front of the other, of a truck pivotally mounted on a horizontal axis to oscillate in a vertical plane between the sprocket wheels, an endless, flexible traction member passing around said sprocket wheels and truck and embodying jointed link sections forming continuous rails, a plurality of rollers on the truck bearing on the edges of said rails and a plurality of supplemental rollers laterally outside of the truck rollers and bearing on the traction member outside of the rails whereby the lateral inclination of the traction member and main frame with relation to each other will be prevented.

In testimony whereof I have hereunto set my hand in the presence of two subscribing witnesses.

BENJAMIN HOLT.

Witnesses:
R. E. MANN,
L. S. MOORE.